(12) United States Patent
Chang et al.

(10) Patent No.: US 7,590,978 B2
(45) Date of Patent: Sep. 15, 2009

(54) INFERRING OBJECT INVARIANT METHOD AND SYSTEM

(75) Inventors: Bor-Yuh Evan Chang, Berkeley, CA (US); K. Rustan Leino, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 783 days.

(21) Appl. No.: 11/107,276

(22) Filed: Apr. 15, 2005

(65) Prior Publication Data

US 2006/0236305 A1    Oct. 19, 2006

(51) Int. Cl.
  *G06F 9/45* (2006.01)
(52) U.S. Cl. .................. 717/155; 717/154; 717/151
(58) Field of Classification Search .............. 717/9, 717/107, 130, 141, 155, 154; 715/215
   See application file for complete search history.

(56) References Cited

U.S. PATENT DOCUMENTS

| | | | |
|---|---|---|---|
| 5,613,122 | A | 3/1997 | Burnard et al. |
| 5,987,252 | A | 11/1999 | Leino et al. |
| 6,031,993 | A | 2/2000 | Andrews et al. |
| 6,070,008 | A | 5/2000 | Korenshtein |
| 6,081,665 | A | 6/2000 | Nilsen et al. |
| 6,149,318 | A | 11/2000 | Chase et al. |
| RE37,722 | E | 5/2002 | Burnard et al. |
| 6,401,182 | B1 | 6/2002 | Sweeney |
| 6,611,840 | B1 | 8/2003 | Baer et al. |
| 6,670,969 | B1 | 12/2003 | Halstead, Jr. et al. |
| 6,925,638 | B1* | 8/2005 | Koved et al. ............. 717/155 |
| 7,024,661 | B2 | 4/2006 | Leino et al. |
| 7,111,233 | B1* | 9/2006 | Ballantyne et al. ........ 715/215 |
| 7,114,147 | B2* | 9/2006 | Ballantyne et al. ........ 717/107 |
| 7,120,902 | B2 | 10/2006 | Flanagan et al. |
| 7,168,071 | B2 | 1/2007 | Wu et al. |
| 7,289,964 | B1 | 10/2007 | Bowman-Amuah |
| 7,346,844 | B1 | 3/2008 | Baer et al. |
| 2001/0044931 | A1* | 11/2001 | Kyushima et al. ............. 717/9 |
| 2002/0046393 | A1 | 4/2002 | Leino et al. |
| 2002/0112201 | A1 | 8/2002 | Flanagan et al. |
| 2002/0120428 | A1 | 8/2002 | Christiaens |
| 2002/0133806 | A1 | 9/2002 | Flanagan et al. |
| 2003/0131284 | A1 | 7/2003 | Flanagan et al. |

(Continued)

OTHER PUBLICATIONS

Barnett et al., "Friends Need a Bit More: Maintaining Invariants Over Shared State," *Mathematics of Program Construction 2004*, Feb. 6, 2004.

(Continued)

*Primary Examiner*—Insun Kang
(74) *Attorney, Agent, or Firm*—Klarquist Sparkman LLP

(57) ABSTRACT

A local analysis analyzes the values of objects paying attention to program flow and a global analysis analyses the object independent of the flow. The local and global analysis interact to infer the invariants of objects used within a computer program. The local analysis is given the known invariants of an object by the global analysis when the object transitions from a valid to a mutable state. It then keeps track of all of the values of objects encountered until the object transitions from mutable to a valid state, when the information known to the local analysis is passed to the global analysis, which may use the new object values to add to the current list of invariants for the given object.

15 Claims, 7 Drawing Sheets

U.S. PATENT DOCUMENTS

| | | |
|---|---|---|
| 2004/0060041 A1 | 3/2004 | Demsey et al. |
| 2005/0066319 A1* | 3/2005 | DeLine et al. ............... 717/141 |
| 2006/0143429 A1 | 6/2006 | Nishiyama et al. |
| 2006/0206883 A1 | 9/2006 | Sabbouh |
| 2006/0225034 A1 | 10/2006 | Peck et al. |
| 2006/0230392 A1* | 10/2006 | Duale et al. ................. 717/130 |
| 2006/0248518 A1 | 11/2006 | Kundert |
| 2007/0089103 A1 | 4/2007 | Iborra et al. |
| 2007/0271562 A1 | 11/2007 | Schumacher et al. |
| 2008/0295079 A1 | 11/2008 | Yiftachel et al. |

OTHER PUBLICATIONS

Barnett et al., "The Spec# Programming System: An overview," *CASSIS 2004*, Oct. 12, 2004.
Blanchet et al., "A Static Analyzer for Large Safety-critical Software," *PLDI 2003*, Jun. 9-11, 2003.
Burdy et al., "An Overview of JML Tools and Applications," International Journal on Software Tools for Technology Transfer (2005).
Chang et al., "Abstract Interpretation with Alien Expressions and Heap Structures," *VMCAI 2005*, pp. 147-163.
Chang et al., "Inferring Object Invariants," AIOOL 2005.
Cousot et al., "Abstract Interpretation: A Unified Lattice Model for Static Analysis of Programs by Construction or Approximation of Fixpoints," *Fourth POPL* (1977), pp. 238-252.
Cousot et al., "Automatic Discovery of Linear Restraints Among Variables of a Program," *Fifth POPL* (1978), pp. 84-96.
Das, "Unification-based Pointer Analysis with Directional Assignments," *PLDI 2000*, pp. 35-46.
Hoare et al., "An Axiomatic Definition of the Programming Language PASCAL," Acta Informatica 2 (1973), pp. 335-355.
Lahiri, S. K., "Unbounded System Verification Using Decision Procedure and Predicate Abstraction," Ph.D. thesis, Carnegie Mellon University (2004).
Leino et al., "Object Invariants in Dynamic Contexts," *ECOOP 2004*, pp. 491-516.
Leino, "Toward Reliable Modular Programs," Ph.D. thesis, California Institute of Technology (1995).
Logozzo, F., "Class-level Modular Analysis for Object Oriented Languages," *SAS 2003*, (2003), pp. 37-54.
Logozzo et al., "Separate Compositional Analysis of Class-based Object-oriented Languages," *AMAST 2004*, (2004), pp. 332-346.
Meyer, B., "Object-oriented Software Construction," Series in Computer Science, Prentice-Hall International, 1988.
Jones et al., "Flow Analysis and Optimization of Lisp-like Structures," S. S. Muchnick and N. D. Jones, editors, *Program Flow Analysis. Theory and Applications*, Prentice-Hall, 1981 pp. 102-131.
Poetzsch-Heffter, A., "Specification and Verification of Object-Oriented Programs," Habilitationsschrift, Technische Universität München (1997).
Sagiv et al., "Parametric Shape Analysis Via 3-Valued Logic," TOPLAS 24 (2002), pp. 217-298.
Steensgaard, B., "Points-to Analysis in Almost Linear Time," *23rd POPL* (1995), pp. 1-10.
Venet et al., "Precise and Efficient Static Array Bound Checking for Large Embedded C Programs," *PLDI 2004*, (2004), pp. 231-242.
Abrahám-Mumm et al., "Verification for Java's Reentrant Multithreading Concept," in Foundations of Software Science and Computation Structures, 5th International Conference, FoSSaCS 2002, vol. 2303 of Lecture Notes in Computer Science, pp. 5-20, Springer (Apr. 2002)16 pages.
Bachmair et al., "Abstract Congruence Closure and Specializations," *Conference on Automated Deduction, Cade* 2000, vol. 1831, pp. 64-78 (Jun. 2000) 15 pages.
Barnett et al., "Verification of Object-Oriented Programs with Invariants," *Journal of Object Technology*, vol. 3, No. 6, pp. 27-56 (Jun. 2004) 30 pages.
Boyapati et al., "Ownership Types for Safe Programming: Preventing Data Races and Deadlocks," in Proceedings of the 2002 ACM SIGPLAN Conference on Object-Oriented Programming Systems, Languages and Applications, OOPSLA 2002, vol. 37, No. 11 in SIGPLAN Notices, pp. 211-230, ACM (Nov. 2002) 20 pages.
Cousot et al., "Systematic Design of Program Analysis Frameworks," *Sixth POPL*, pp. 269-282 (Jan. 1979) 15 pages.
DeLine et al., "Enforcing High-Level Protocols in Low-Level Software," 2001, 11 pages.
DeLine et al., "Typestates for Objects," *Proc. European Symp. on Object Oriented Programming*, (Jun. 2004), 26 pages.
Detlefs et al., "Extended static checking," Research Report 159, Compaq Systems Research Center, 50 pages, Dec. 1998.
Deutsch, "Static Verification of Dynamic Properties," Polyspace Technologies, Inc., 8 pages, Nov. 2003.
Fahndrich et al., "Adoption and Focus: Practical Linear Types for Imperative Programming," 12 pages, 2002.
Flanagan et al., "Atomizer a Dynamic Atomicity Checker for Multithreaded Programs." in Proceedings of the 2004ACM SIGPLAN-SIGACT Symposium on Principles of Programming Languages (POPL 2004), vol. 39, No. 1 in SIGPLAN Notices, pp. 256-267, ACM, Jan. 2004, 12 pages.
Flanagan et al., "Extended Static Checking for Java." In Proceedings of the 2002 ACM SIGPLAN Conference on Programming Language Design and Implementation (PLDI), vol. 37, No. 5 in SIGPLAN Notices, pp. 234-245, ACM, May 2002, 12 pages.
"Fugue - Protocol Checking for .NET Code," downloaded from the World Wide Web on Aug. 9, 2005, 1 page.
Freund et al., "Checking Concise Specifications for Multithreaded Software," Journal of Object Technology, 3(6):81-101, Jun. 2004, 21 pages.
Gulwani et al., "Join algorithms for the theory of uninterpreted functions," *Proceedings of the 24$^{th}$ Conference on Foundations of Software Technology and Theoretical Computer Science*, 12 pages. (Dec. 2004).
Hoare, "Monitors: an Operating System Structuring Concept," Communications of the ACM, 17(10):549-557, Oct. 1974, 26 pages.
Hote et al., "Run-Time Error Detection through Semantic Analysis: A Breakthrough Solution to Today's Software Testing Inadequacies," *Polyspace Technologies, Inc.*, 10 pages. (Sept. 2001).
Hudak et al., Collecting Interpretations of Expressions," ACM, ACM Transactions on Programming Languages and Systems," vol. 13, No. 2, pp. 269-290, Apr. 1991, 22 pages.
Leino et al., "Modular Verification of Global Module Invariants in Object-Oriented Programs," Technical Report 459, ETH Zürich, 16 pages, 2004.
Lev-Ami et al., "Putting Static Analysis to Work for Verification: A Case Study," *International Symposium on Software Testing and Analysis*, pp. 26-38 (2000) 13 pages.
Logozzo, "Separate Compositional Analysis of Class-Based Object-Oriented Languages," *Proc. of the 10$^{th}$ Intl Conf on Algebraic Methodology and Software Technology*, vol. 3116, pp. 332-346 (Jul. 2004) 15 pages.
Manson et al., "Requirements for Programming Language Memory Models," Workshop on Concurrency and Synchronization in Java Programs, in association with PODC, 10 pages, Jul. 2004.
McCarthy et al., "Correctness of a Compiler for Arithmetic Expressions," Proceedings of Symposia in Applied Mathematics, 11 pages (1967).
Müller, "Modular Specification and Verification of Object-Oriented Programs," vol. 2262 of Lecture Notes in Computer Science, PhD thesis, FernUniversität Hagen, Springer-Verlag, Oct. 8, 2001, 302 pages.
Nelson, "A Generalization of Dijkstra's Calculus," *ACM Trans. on Programming Languages and Systems*, vol. 11, No. 4, pp. 517-561 (Apr. 2, 1987) 76 pages.
Nelson et al., "Simplification by Cooperating Decision Procedures," Stanford Artificial Intelligence Laboratory Memo AIM-3 11, 21 pp. (Apr. 1978) 13 pages.
Noble et al., "Flexible Alias Protection," In Eric Jul, editor, ECOOP'98—Object-Oriented Programming: 12th European Conference, vol. 1445 of Lecture Notes in Computer Science, pp. 158-185, Springer, Jul. 1998, 28 pages.
Owicki et al., "An Axiomatic Proof Technique for Parallel Programs," Acta Informatica, 6:319-340, 1976, 22 pages.

Qadeer et al., "Summarizing Procedures in Concurrent Programs," In Proceedings of the 2004 ACM SIGPLAN-SIGACT Symposium on Principles of Programming Languages (POPL 2004), vol. 39, No. 1 in SIGPLAN Notices, pp. 245-255, ACM, Jan. 2004, 11 pages.

Savage et al., "Eraser: A Dynamic Data Race Detector for Multi-Threaded Programs," ACM Transactions on Computer Systems, 15(4):391-411, Nov. 1997, Also appears in Proceedings of the Sixteenth ACM Symposium on Operating System Principles, pp. 27-37, Operating System Review 31(5), 1997, 21 pages.

Stransky, "A Lattice for Abstract Interpretation of Dynamic (LISP-like) Structures," *Inf. Comput.*, vol. 101, No. 1, pp. 70-102 (1992) 33 pages.

"Vault - A Programming Language for Reliable Systems," printouts of pages from the World Wide Web, downloaded on Aug. 9, 2005, 47 pages.

Yi et al., "Automatic Generation and Management of Interprocedural Program Analyses," ACM, pp. 246-259, 1993, 14 pages.

* cited by examiner

```
102  class A {
         int x ;
104      A( ) { this.x := 8 ;
105      }
106      method M( ) {
108          this.x := this.x + 1 ;
109      }
     }
```

```
120  class B {
         int x ;
122      B() {
124          this.x := 8 ;
         }
126      method M(B b) {
128          this.x := b.x + 1 ;
         }
     }
```

```
132  class C {
         int x ;
134      C( ) {
136          this.x := 8 ;
         }
138      method M(C c) {
140          c.x := 7 ;
         }
     }
```

FIG. 1
(Prior Art)

```
       y:=2;
250    x:=0;
252    if x<0 then
254       y:=1;
       else
          y:=-1;
       endif;
       ....
```

```
      class D extends B {
        int y ;
602     D() {                                     ⟨D ↦ ⊥; T⟩              604
606       this.y := 1 ;                           ⟨D ↦ ⊥; sel(H, this, y) = 1⟩  608
610       pack this as D ;      ⟨D ↦ sel(H, t, y) = 1; (H, this, y) = 1⟩  612
        }
      }
614   class B {
        int x ;
        B() {                                     ⟨D ↦ sel(H, t, y) = 1, B ↦ ⊥; T⟩
616       this.x := 8 ;        ⟨D ↦ sel(H, t, y) = 1, B ↦ ⊥; sel(H, this, x) = 8⟩  618
620       pack this as B ;
                               ⟨D ↦ sel(H, t, y) = 1, B ↦ sel(H, t, x) = 8; sel(H, this, x) = 8⟩  622
        }
624     method M(D d) {
          ⟨D ↦ sel(H, t, y) = 1, B ↦ sel(H, t, x) = 8; sel(H, d, y) = 1 ∧ sel(H, d, x) = 8⟩  * 626
628       unpack this from B ;
      ⟨D ↦ sel(H, t, y) = 1, B ↦ sel(H, t, x) = 8; sel(H, d, y) = 1 ∧ sel(H, d, x) = 8 ∧ sel(H, this, x) = 8⟩  630
634       this.x := d.x + d.y ;
                               ⟨D ↦ sel(H, t, y) = 1, B ↦ sel(H, t, x) = 8; sel(H, this, x) = 9⟩  636
638       pack this as B ;
        }                      ⟨D ↦ sel(H, t, y) = 1, B ↦ sel(H, t, x) ≥ 8; sel(H, this, x) = 9⟩  640
      }
```

INFERRING OBJECT INVARIANT METHOD AND SYSTEM

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD

The field relates to methods for proving the correctness of a computer program. More particularly, the field relates to inferring object invariants which are not explicitly declared within a computer program.

BACKGROUND

Proving the correctness of a computer program requires knowledge about the program that is not readily available in the program text. For example, loops within a computer program can be proven correct using mathematical induction. However, to do so, one needs to know the loop invariant—a condition that is true when control enters the loop, remains true while the body of the loop is executed, and is still true when control exits the loop. Similarly, to prove the correctness of a class in an object-oriented program, one may need to know what the invariants of the class are, and whether they are preserved. An object invariant is an assertion about a class that is true—most of the time. More specifically, an invariant holds when no method belonging to the object is executing.

Invariants can be difficult to determine. To more specifically consider some of the pitfalls in determining invariants, consider the classes (written in Java-like pseudocode) shown in FIG. 1. For class A 102, the constructor A 104 initializes this.x to "8" 104, and the method M 106 increments this.x subsequently 108. Therefore condition this.x$\geq$8 104 holds on exit from the constructor A 104, on entry to method M 106 and on exit from the method M 109. Thus, we wish to obtain from our analysis that this.x$\geq$8 is an object invariant for A. One way for inferring the object invariant this.x$\geq$8 is to treat the field select expression this.x as denoting one variable, essentially focusing the analysis on one (arbitrary) object at a time. Then, looking at all possible values for this.x the condition this.x$\geq$8 may be inferred, from which can be concluded ($\forall$a:A·a.x$\geq$8).

But this method has problems. Class B 120 illustrates the need to know about properties of objects other than this 124, 128. Focusing only on what can be said about this.x gives no information about another object that might influence this.x, in this case b.x in method B.M 126, which is used to modify the value of this.x 128 in the statement this.x=b.x+1 128. As we currently have no knowledge of the possible values of b.x, 128 we also cannot make any assumptions about the possible values of this.x, and thus we are not be able to establish any information about invariants from our analysis of this piece of code.

Perhaps more critically, class C 132 demonstrates that the existence of aliasing makes the problem even more difficult. In class C 132, the constructor C 134 initializes this.x to "8" 136, as we have seen before. But then Method C.M 138 updates the x field of an object with a name other than this—c.x 140, so it is easy to miss that this update actually occurs on an aliased this object with the result that the analysis would then incorrectly infer this.x=8, which would suggest the fallacious ($\forall$c:C·c.x=8).

A method of inferring object invariants both in the presence of aliasing and when using invariant information about other objects is therefore needed.

SUMMARY

Described herein are methods and systems for inferring object invariants within a computer program. In one aspect, objects may be either mutable or valid. A local analysis of the program is at least partially run. While running, the local analysis notes a local value of an object field.

A global analysis of the program is also partially run. When the local analysis reaches a program point where the object transitions from mutable to valid, the local analysis information about the object is given to the global analysis. In an exemplary embodiment this point is marked by a pack statement. In some embodiments, when the local analysis reaches a program point where the invariant of an object becomes mutable, at least a portion of the global analysis information about the object is then given to the local analysis. This program point is marked by an unpack statement. When an object is mutable, its values are still recorded by the local analysis, but the global analysis does not reflect them, storing only values held when the object is valid.

In another embodiment, which allows the local analysis to only store values held by a specific object between two program points, a computer-readable medium stores a representation of invariant states of a sequential computer program, the invariant state representation comprising both a representation of a flow-sensitive analysis state which is the values of at least one object encountered between two program points; and a representation of a flow-insensitive analysis state which stores substantially all of the values for substantially all of the objects encountered up to a given program point. The flow sensitive analysis state and the flow-insensitive analysis state exchange information between them at an exchange program point. In an exemplary embodiment, exchange points can be pack and unpack statements.

In a system implementation, the system comprises a compiler, a flow-sensitive analysis module and a flow-insensitive analysis module. The flow-sensitive analysis module stores the value or values that an object holds in some portion of the computer program. The flow-insensitive analysis module stores essentially all of the values that a given object holds from the beginning of the program to some intermediate program point. The system further consists of a mutable location module which, during the invariant generation process locates where an object moves from a valid to a mutable state. A flow-insensitive instantiation module is also often included. It instantiates the partial flow-insensitive analysis invariant state for an object O within the at least partial flow-sensitive analysis invariant state.

The foregoing and other objects, features, and advantages of the invention will become more apparent from the following detailed description, which proceeds with reference to the accompanying figures.

BRIEF DESCRIPTION OF THE DRAWINGS

FIG. 1 is a prior art drawing of pseudo-code snippets which give examples of where object invariants may be difficult to determine.

FIG. 6 is an example illustrating the methods shown in FIG. 3 and the invariant states shown in FIG. 4.

DETAILED DESCRIPTION

Overview

Local analysis, in general, looks at the state of the program at each program point, and takes into account the order in which the statements are executed—the program is looked upon as a sequence of statements, with the effect that different properties of a given field may be discovered at different statements. Because the actual flow of the program is considered, values held at unreachable statements are not incorporated. This analysis is precise but previously has been expensive in terms of both running time and storage requirements.

Global analysis handles the program as a set of statements that do not have an ordering. Therefore, properties of a given field are determined that hold for the program as a whole. A variable (field) value that is held at one location only in the program is given the same weight as a variable value that holds for the bulk of the program running time. Furthermore, values held at unreachable states are also considered—so values can be over-approximated. More generally, global analysis is much faster and requires much less space than local analysis but is much less precise. An exemplary overall system uses local analysis to examine the state of (essentially) each field at (essentially) each program point of interest, but rather than storing all of this location-specific information separately, when the local analysis discovers valid invariant values, it stores them within the global analysis invariant storage, and thus requires minimal storage requirements itself.

Figures 2A, 2B:
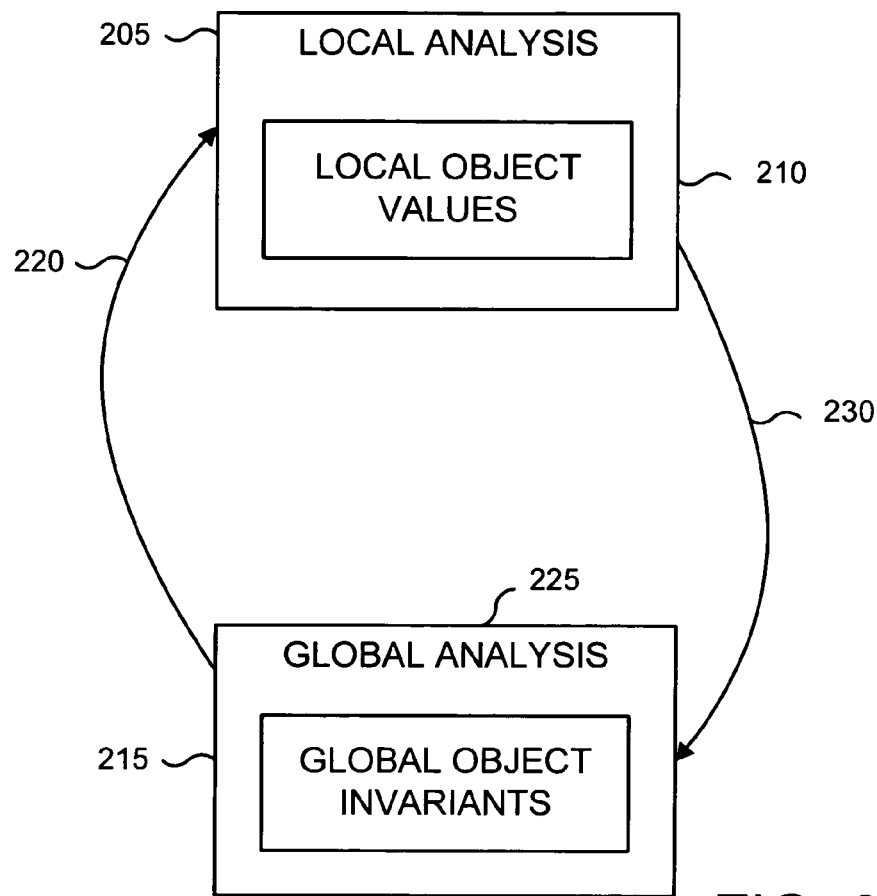
FIG. 2A is an overall method for inferring object invariants using both local and global analysis to determine object invariants even when objects reference other objects and when the objects are aliased.
FIG. 2B is code fragment used to illustrate the exemplary method disclosed in FIG. 2A.

The differences between local and global analysis can be explained with reference to FIG. 2B. Local analysis will evaluate the code fragment shown at each separate line. As x will never be less than zero 250, the if branch of the if-then loop 252 is unreachable. Therefore, the unreachable statement y:=1 254 will not be included within the analysis with the result that the invariants established for y will be 2 and −1. Global analysis will not take into account the unreachability of y=1 254, and so will list y's invariants as 2, −1, and 1, at a minimum.

In an exemplary embodiment, the local analysis and global analysis interact to generate object invariants. A brief overview of this relationship is shown, generally, in FIG. 2A. The flow-sensitive local analysis 205 moves flow-sensitively and infers properties of the program at each desired program point. At these program points, it determines properties of local variables and of heap locations (explicit or implicit) that can be reached from the local variables. At set points in the program, embodied by pack statements, the local analysis 205 passes 230 any information it has gleaned about local fields 210 to the flow-insensitive global analysis 225, which then may use this information to widen the invariant for a particular object. An object invariant may be stored within the global analysis 215, or may be stored elsewhere.

The local analysis, as it is passed invariant information for an object when necessary, is freed from the necessity of storing the large set of information (both value and location) that usually accompanies traditional local analysis.

Object invariants declare constraints on values that can be stored in the fields of an object. These object invariants sometimes hold, and sometimes are temporarily violated. If a given object is valid, its object invariant can be relied upon. If it is mutable then its object invariant may temporarily be violated. It is the set of valid objects that our analysis keeps track of collectively. The valid objects are class instances in their "steady states," which means that it is plausible to imagine that these objects satisfy some common constraint, namely the object invariant of their respective classes. Only a mutable object can be modified.

More specifically, when the local analysis 205 encounters an object, the invariants for that object as determined by the global analysis 215 are given 220 to the local analysis 205 to provide the local analysis 205 more information. When the local analysis 205 reaches a program point where the invariant of a given object is supposed to hold, that is, the object is in a valid state, the information that it has about the object 210 is given 230 to the global analysis.

Figure 3:
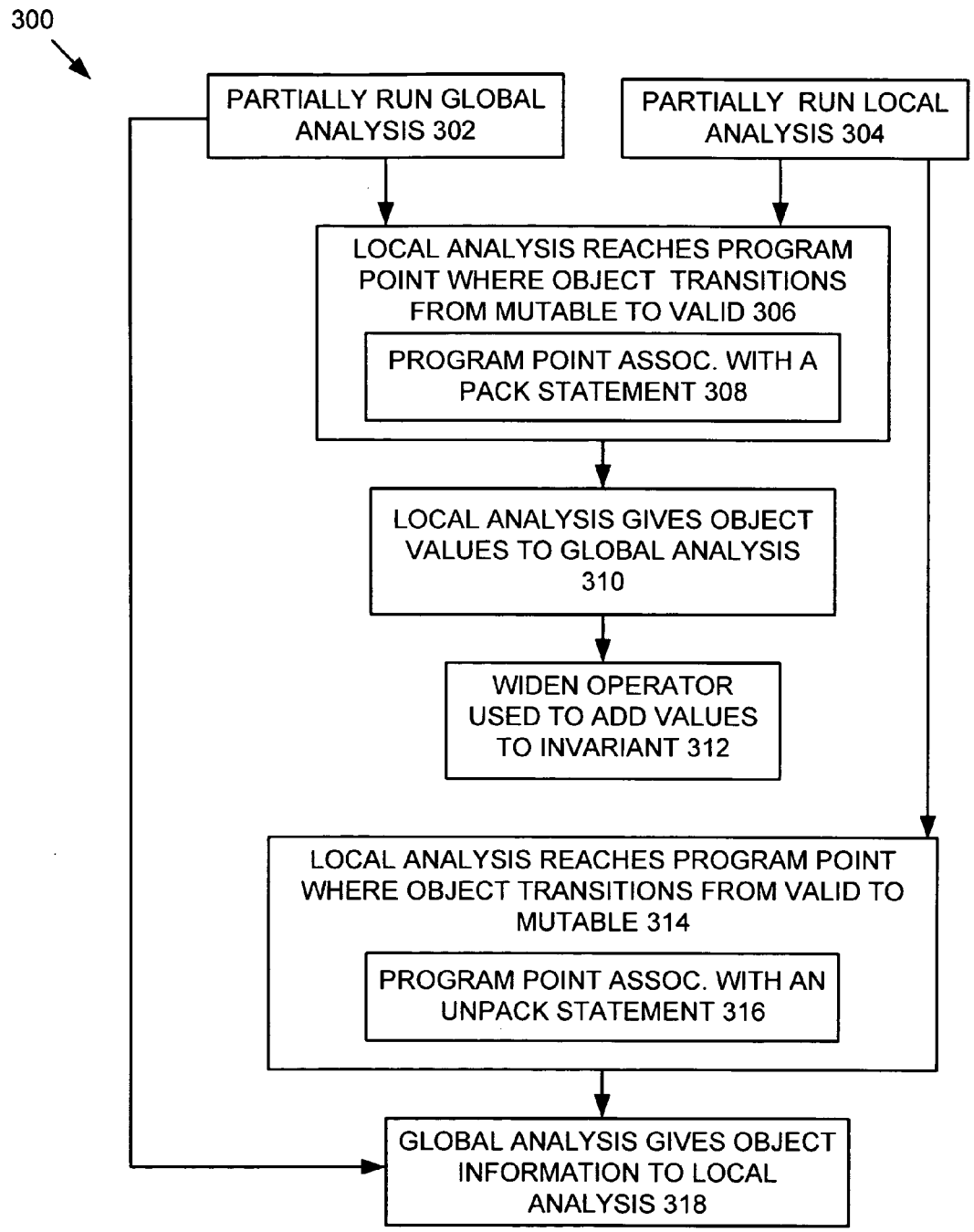
FIG. 3 is a flow diagram illustrating a method for passing information between a local analysis and a global analysis to infer object invariants.

Exemplary Method for Inferring Object Invariants by Exchanging Information Between Local Analysis and Global Analysis Referring to FIG. 3, flowchart 300 shows an exemplary embodiment of the methods discussed herein. At process block 302, a global analysis is at least partially run. At process block 304, a local analysis is, similarly, at least partially run. At process block 306, the local analysis reaches a program point where an object transitions from mutable to valid which, in an exemplary embodiment, is at a pack statement 308.

We make the following assumptions about the code we analyze:
- an object o transitions from mutable to valid by the execution of a special statement pack o
- an object o transitions from valid to mutable by the execution of a special statement unpack o
- a field update o.x:=e takes place only when the object o is mutable Note that the pack and unpack statements need not be provided directly by the programmer; they can also be implied by rules in the source language, by rules in some stylized use of the language, by compiler rules, by intermediate compilation rules, or by some other form. In an exemplary example, an unpack may be supplied automatically on method entry and pack may be similarly supplied on method exit. Another exemplary embodiment provides an unpack statement at the beginning of each public method and a pack statement at the end of each public method.

In some exemplary embodiments each class frame of an object has a mutable/valid state bit (within the class frame itself, or associated with a subclass). A class frame is the set of declared fields of a particular class. For example, if B is a subclass of A, then a B object can be valid for A and mutable for B. This allows each subclass to declare its own object invariant.

The statements we consider in this scheme are pack o as T and unpack o from T, which change object o's mutable/valid bit for class frame T. If x is a field declared in a class T, then we assume a field update o.x:=e takes place only when o is mutable for T. These pack and unpack statements may be declared explicitly by a programmer, or may be incorporated in an intermediate representation of the program.

This analysis checks for values at each program point that is considered of interest. Informally, a program point can be any code fragment within a computer program. Specifically, any character within a program may correspond to zero or more program points. A program point can also be thought of as a specific value of the program counter. Common places within a program that it is useful to think of as program points are: the call site of a function or procedure call, the entry point of a function or procedure call, a declaration of a function or procedure call, a return call from a function or procedure, a global assignment, a control structure, such as an if-then, a while, a do-while, a switch, an expression or an assignment statement, and so forth. For a given instantiation, just a few of the potential program points will be used. A common analysis uses a single line of code as written by a programmer to be a program point, another common analysis uses a single compiled line of code as a program point, many other choices are possible as well.

At process block 310 the local analysis retrieves the last value that the local analysis found, paying attention to program flow, to be held by an object field. This value is then given to the global analysis. As only the last value held by an object field is given to the global analysis, the effect is that any transient values held by the object field that potentially might have violated the object invariant will not be passed to the global analysis. But, the value held by the local analysis when the object makes the transition from mutable to valid will itself be valid, and so it can safely be added. If the local analysis at this state contains a value not yet held by the object invariant, the invariant will have to be widened 312 to accept the new value.

At program point 314, the local analysis reaches a program point where an object transitions from valid to mutable—it enters a state where its invariants may be violated. In some embodiments, this is represented by an unpack statement 316. While the object is mutable, the values held by fields of the object are not to be included within the object invariant list. But the local analysis needs to know those valid values of the object which are stored in the global analysis. Therefore, the global analysis retrieves the information it possesses about an object—its current invariant values—and passes it into the local analysis 318.

To handle object references, in an exemplary embodiment, a field read expression o.x is treated in the source language as indexing into an explicit heap (represented by the variable H) at location $H$o, x$\langle$, where A.o is the object reference (i.e., object identity, pointer, or address) and x is a uniquely valued constant that names the field x, written in our terminology as sel (H, o, x). To handle field updates, the framework additionally uses a heap succession predicate $H \equiv_{o,x} H'$, which asserts that heaps H and H' store the same values for all locations, with the possible exception of the location $H$o, x$\langle$. In other embodiments, the explicit heap, above, is replaced by an implicit heap.

Starting from an initial state represented by an abstract-domain element L, performing a forward analysis on a field update statement o.x:=e amounts to applying the following abstract-domain operations, where H' is a fresh variable:

L:=Constrain(L, sel(H'o, x)=e);

L:=Constrain(L, $H \equiv_{o,x} H'$);

L:=Eliminate(L,H);

L:=Rename(L,H',H);

These operations introduce a name H' for the heap after the update statement, and constrain H' using the "sel" function statement and the heap succession predicate. Then, the old heap H is projected out and the name heap H' is renamed to H.

Note that the problems with the classes B and C above arise even if there are no aliasing issues. What the examples show is that our analysis must somehow simultaneously keep track of the state of multiple objects (like this.x, b.x in B.M, and c.x in C.M). This situation may look pretty grim, because not only is there no bound on the number of different objects but all of these objects can simultaneously be in different states. As a solution, we abstract over a particular subset of objects and keep track of their states collectively.

In some exemplary embodiments each class frame of an object has a mutable/valid state bit (which is within the class frame itself, or associated with a subclass). A class frame is the set of declared fields of a particular class. For example, if B is a subclass of A, then a B object can be valid for A and mutable for B. This allows each subclass to declare its own object invariant. The statements we consider in this scheme are therefore pack o as T and unpack o from T, which change object o's mutable/valid bit for class frame T. If x is a field declared in a class T, then we assume a field update o.x:=e takes place only when o is mutable for T.

Correctness

This section describes an exemplary implementation of the technique to infer object invariants using the abstract interpretation-based framework. The framework is parameterized by various traditional abstract domains, which determine the kind of invariants that we infer about objects.

The umbrella term given to work which reasons abstractly about computer programs prior to the program's execution using their source code is "static analysis." Abstract interpretation is used to prove the correctness of the static analysis by choosing a specific property of the program (the property of interest), and inferring if the property of interest is satisfied or violated by the program. Some properties of interest that have been studied are: constant propagation, i.e. does a given constant always evaluate to the value or set of values; common subexpression elimination; i.e., do two given expressions always compute to the same result; dead code elimination, i.e, does a given portion of a program ever execute; and so on. More specifically, abstract interpretation systematically computes over-approximations of sets of reachable program states. The over-approximations are represented as elements of a given lattice, called an abstract domain. These elements of the abstract domain can be viewed as constraints on a set of variables, typically the variables of the program. The abstract domain is designed to express the property of interest with sufficient precision to analyze whether or not it holds. When thinking about constraints, one must keep in mind that the abstract domain understands constraints consisting of variables and function or relation symbols supported by the abstract domain. If a given constraint mentions functions or relation symbols not supported by the abstract domain, the unknown functions and symbols are ignored (or very coarsely over-approximated) by the abstract domain. Therefore, many abstract domains can be built depending upon the property of interest to be represented.

For example, an abstract domain, known as the polyhedra abstract domain, can represent linear-arithmetic constructs, such as x+y<=10. Other abstract domains include the congruence-closure abstract domain, and the heap succession abstract domain.

In the embodiments described herein, we describe a flexible mechanism by which object invariants can be inferred and defer to the user the choice of policy, and hence, abstract domain to use. The user also can choose how precise to make the analysis. In an exemplary embodiment, we consider a single such abstract domain, which we shall call the policy abstract domain.

Let P denote the given policy domain. We denote the abstract domain given by this extension by C(P, S) where S indicates the presence of the abstract domain that handles the heap succession predicate for heap updates.

The abstract state of the local flow-sensitive analysis is precisely an element of C (P, S). Meanwhile, the global flow-insensitive analysis tracks the object invariant for each class T, which is simply a constraint on fields of valid objects of class T representable by C(P), the policy domain extended to reason on heap locations. Thus, the abstract state of the global analysis is a mapping from classes to elements of C(P), which we denote by I. (The heap succession domain S is not needed to represent object invariants, as it is only needed to reason about updates to heaps whereas the object invariant applies globally to all heaps.) More precisely, the concretization of an element of I is a conjunction of universally-quantified propositions of the following form:

$$(\forall H \cdot (\forall t:T \cdot \text{Valid}(t) \Rightarrow \text{ToPredicate}_{C(P)}(C)))$$

where C is an element of C(P) whose only free variables are t and H. Moreover, the sel expressions in $\text{ToPredicate}_{C(P)}(C)$ should be of the form sel(H, t, x) for any field x of T or superclass thereof.

We now describe the abstract interpretation by defining the following abstract transition judgment for a statement s:

$$s: H_{\text{I};\text{C}} \langle \rightarrow H_{\text{I}';\text{ C}'} \langle$$

where I and I' are elements of I and C and C' are elements of C(P, S). We write the combined abstract state $H\text{I}; \text{C}\langle$ at each program point for notational convenience, but while there is one C per program point as in standard abstract interpretation, there is only one global I. As usual, the C is initially bottom ($\bot_{C(P,S)}$) at each program point, except in some initial state where it is top ($\bot_{C(P,S)}$)). Similarly, the global I is also initially bottom (i.e., each class T is mapped to ($\bot_{C(P)}$)).

The global and local components of the abstract state interact precisely at the unpack and pack statements. At each statement pack o as T, the program asserts the object invariant for class T to hold for the object o, so we incorporate any properties inferred about the fields of o into the local analysis. Roughly speaking, we need to obtain from C the constraints involving fields of o declared in T or any superclass of T (i.e., expressions of the form sel(H, o, x) for fields x of class T). Then, rename o to t in the local invariant and weaken the current global I (invariant) with it. As we show with an example below, this weakening must be performed with a widen operator to ensure termination of the analysis, not simply a join operator. A widen operator differs from a join operator in that the widen operator has a finite limit on the number of times a cycle can be followed, ensuring termination. However, some sequence of successively coarser widening operators can be used, of which the first few may be join operations.

More precisely, the handling of pack is as follows:

$$\frac{P = C \uparrow sel(H, o, *_T)}{\text{pack } o \text{ as } T: \langle I, C \rangle \rightarrow \langle I[T \mapsto I(T) \nabla [t/o]P]; C \rangle}$$

where H is heap variable for the current heap. We write $\nabla$ for the widen operator and [y/x]e for the capture-avoiding renaming of variable x to y in expression e. Also, we write $C \uparrow e$ for the operation that may drop constraints from C, keeping only those constraints that have no free variables other than those occurring in subexpressions that match e (in which "$*_T$" matches any field declared in class T or superclass of T). As applied above, this operation obtains the constraints that involve only the fields of o. For example, if x, y, z represent fields declared in class T and C represents sel(H, o, x)≦5^sel (H, o, y)≦sel(H, p, z), then what $C \uparrow sel(H, o, *_T)$ returns represents sel(H, o, x)≦5.

One may observe that C is an element of C(P, S), while I(T) is an element of C(P), so the above rule is not quite well-formed. To communicate between the two analyses, the language of discourse is that of first-order logic—we first concretize and extract the predicate of interest from C and then abstract in the abstract domain C(P) before widening. One can view $C \uparrow e$ as a special filtering ToPredicateC(P, S).

During the local analysis, we may need to instantiate an object invariant to obtain a certain property at a particular point. The object invariant methodology ensures that changes to fields are guarded by an unpack statement, in an exemplary embodiment, which thus indicates when the object invariant may be temporarily violated. We instantiate object invariants at unpack statements, as it marks the code section that weakens the object invariant. More precisely, an unpack statement proceeds as follows:

$$\overline{\text{unpackofromT:} H_{\text{I};\text{C}}} \langle \rightarrow H_{\text{I};\text{C}\pi[o/t]I(T)} \langle$$

Similar to pack, the actual interaction is via a conversion of I(T) to a predicate (concretization) and then an abstraction in the abstract domain C(P, S) before the meet ($\pi$) with C.

All other program statements affect only the local abstract state C and proceed basically as standard abstract interpretation (except the reasoning is extended to work with heap structures, as is known in the art). Note that this separation is only obtained because of the object invariant methodology disclosed concerning valid and mutable states. In particular, a field update has no effect on the global abstract state I because the methodology dictates that only a mutable (i.e., unpacked) object can be modified—recall that the object invariant carried in I applies only to valid (i.e., packed) objects. Therefore, temporary violations of the invariant that occur while an object is mutable are not recorded within the invariant state.

EXEMPLARY EXAMPLE

FIG. 6 gives an example analysis of a modified version of class B from FIG. 1 which includes explicit unpack and pack statements. These statements, as has been mentioned previously, may be provided in the source code, or may be automatically included in some intermediate representation of the source code. This example uses the polyhedra domain as the policy domain, though other domains are envisioned to be used as well. For this example, we assume that we have as a precondition that d is valid, which might be user-specified, implied by the rules in the source language or some stylized use of the language, obtained by a separate analysis, or obtained simultaneously with this analysis. When the constructor of class D (which extends the base class B) is entered 602, the invariant is empty, and the local analysis has no information yet 604. D then initializes this.y to the value "1" 606. The local analysis notes that this.y now has the value "1"; as this is a field update, the invariant is not yet changed, and so still holds the empty set 608. At the pack statement in D 610, the value in the local analysis instantiates the information it has about this.y into the global analysis, which moves from empty to "1". Notice that there is no unpack statement in either the D or the B constructor class. This is because when an object is first allocated there is no reason to believe that any object invariant holds, thus, there is no need to unpack it. Once the object has been initialized, however, then the invariant is assumed to hold, and it can be packed as usual.

Following a similar analysis, within the constructor of Class B 614, at the pack statement 620, the initialization value of this.x, 8, 616 is stored in the local analysis 618, is instantiated into the global analysis 622, and also the invariant is widened, so it now holds the value "8" 622.

We have in the initial state of method M that sel(H, d, y)=1^sel(H, d, x)=8 (the y global invariant contains the value "1", the x global invariant contains the value "8") through an instantiation of the current object invariant for D and B 626. The unpack statement in M 628 retrieves the current object invariant of B for this, the value "8"—the invariant value is passed to the local analysis 630. The field update statement 632 does not affect the global state but does update the local analysis, that is, the local analysis records that this.x has been given the value "9" 634. Then, at the pack statement in M 638, the local state informs us that sel(H, this, x)=9, the current value of this.x 640. Note that transient values that may briefly violate an invariant, but are no longer held at the pack statement are not stored in the invariant listing for that object.

We know at the pack statement that the invariant again must hold. Therefore, any value (or values) known by the local state when at the pack statement must be valid and should be added to the global invariant list for that object (or objects). The invariant state is thus widened (the invariant is allowed to accept new values) into the current object invariant for B which interprets the new value to give the result that sel(H, t, x)≧8 for the new object invariant for B. Notice that this gives an over-approximation for B.x in this particular embodiment. Other embodiments may record a slightly different invariant such as sel(H, t, x)="8, 9".

Since this widening brought about a weakening of the current approximation of the object invariant for B, the analysis needs to revisit all program points where the previous approximation for B was instantiated, namely at 624 and 628. Continuing, the analysis proceeds with the larger object invariant list, the analysis revisiting the code starting at line 624, reaching a fixed point when the invariant(s) don't change, after a predetermined number of passes, or using some other user-defined criteria.

The example in FIG. 6 demonstrates why the weakening of the object invariant must be with a widen operator, just as in standard abstract interpretation with looping constructs. In the example, using joins to weaken the object invariant would yield the infinite ascending chain of abstract domain elements.

We note that the class argument to unpack and pack need not be the surrounding class as it is in this example. For example, specifying a superclass would instantiate and update the object invariant of the superclass even when used within the child class.

An Exemplary Method of Inferring Object Invariants That Mention More Than One Object The technique for inferring object invariants we have described thus far does not consider object invariants involving multi-level field accesses, which often are quite important. For example, we may implement a Set class with an array as the backing store where an object invariant is that the cardinality of the set is equal to length of the array as shown immediately below.

```
class Set {
    int card ; int[ ] arr ;
    invariant this.card = this.card = this.length ;
    ...
}
```

In an alternate embodiment, as shown in this example, some (though not necessarily all) invariants may be marked within the program. Other embodiments may require the invariant shown above without the invariant being marked. Without additional support, soundly inferring such an invariant is hard because of aliasing issues—an alias of the arr field of a Set object o could modify the array to which arr points without going through o.arr. Fortunately, an exemplary embodiment of the object invariant methodology, the Boogie method, also helps us with this problem: an ownership model is imposed, and such an object invariant is allowed only if arr is declared to be "owned" by Set (i.e., declared a rep field).

Briefly, an aggregate is an object composed from other objects. A single part of an aggregate is known as a representation object. Fields holding representation objects (within a specific embodiment) are qualified with the rep keyword. Object ownership is defined through these rep fields, which establishes a hierarchy among such objects. The this object (the object's own data fields) owns the object referred to by its rep field, and is able to refer to any fields of the owned object. Without getting any more specific, the methodology assures us that arr as an owned object cannot be made mutable unless o, the owner, is first made mutable (i.e., unpacked). This allows us to instantiate the object invariant for any owned field (e.g., arr) of an object o when o is unpacked and incorporate any information about the fields of owned fields (e.g., arr) when o is packed (and transitively for the owned fields of the owned fields of o). In the context of the analysis described above, the T operation that pulls out constraints involving the fields is extended to also get fields of directly and transitively owned fields. The condition above the line in the rule for pack then in a representative embodiment takes a form shown below (here shown without transitivity):

$$P=C\uparrow\{sel(H, o, *_T), sel(H, (sel(H, o, *rep\ T)),*)\}$$

where *rep T matches any rep field declared in T or a superclass of T, and * matches any field.

Exemplary Method for Inferring Object Invariants

Figure 4:
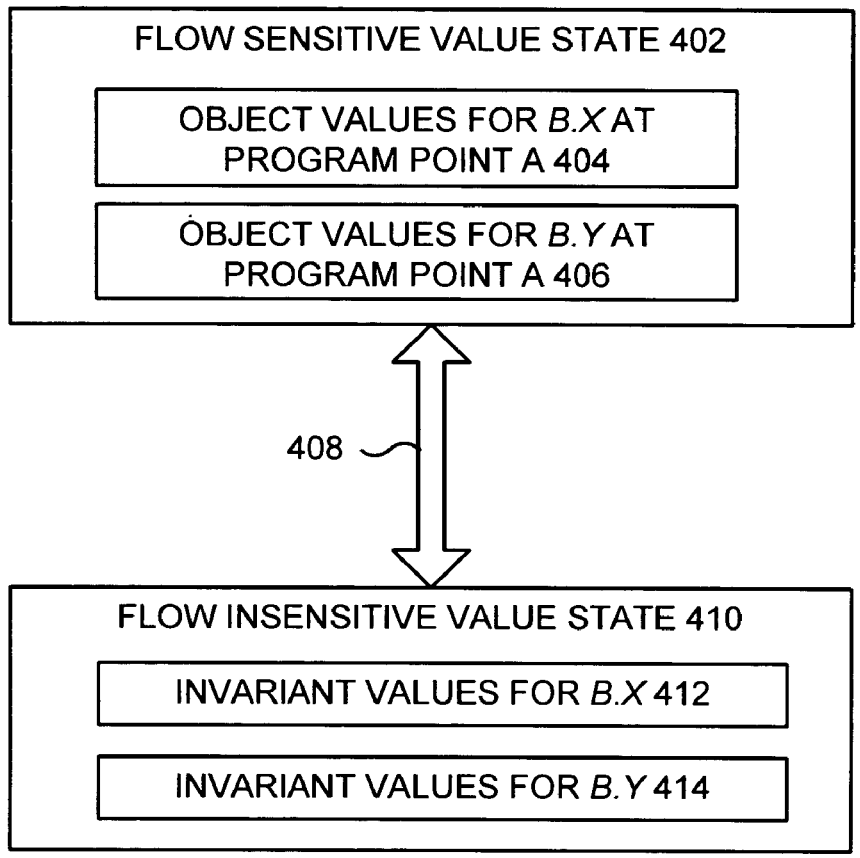
FIG. 4 is a block diagram illustrating an exemplary representation of a flow-sensitive invariant state and a flow-insensitive invariant state.

FIG. 4 describes an exemplary computer-readable medium representation of invariant states of a computer program, as shown, for instance, with reference to FIG. 6. The representation comprises a representation of a flow-sensitive value state 402 of the computer program. The flow-sensitive value state stores, at a minimum, the values held by a given object between two program points. In an exemplary embodiment, the flow-sensitive value state 402 for a given object is passed the known invariant values for that object 408 by the flow-insensitive analysis when that object is mutable, such as at an unpack statement. When the object in question is again valid, such as at the next pack statement (in some embodiments) the information known by the flow-sensitive analysis state is given 408 to the flow-insensitive value state 410, which then stores it until the flow-sensitive analysis needs it again. Therefore, after passing the information 408 from the flow-sensitive value state 402 to the flow-insensitive value state 410, the flow-sensitive value state 402 no longer needs that specific information, which greatly reduces the storage space needed for analysis. However, storing more information than the minimum is not precluded by the systems and methods disclosed herein.

Turning to FIG. 6 at method M 624, we see that the values for this.x and this.y with reference to B are referenced. The flow-sensitive representation, therefore, needs to know the possible values that these fields have held. As mentioned, the flow-sensitive state doesn't need have previously stored internal copies of these values, because the flow-insensitive representation state 410 has a list of the values that thix.y and this.y have held up to this point 412, 414. The flow-sensitive analysis is passed the values "8" for this.x and "1" for this.y 630 from the flow insensitive value state 412, 414. The analysis then proceeds, and at statement 634 this.x is given a new value, "9", which is the stored in the flow-sensitive analysis store for the object field B.x 404, represented by this.x 618. Notice also that the value for the object field B.y 406 is also accessed 634 to give the new value for this.x, though this.y is not modified.

At the pack statement 638, the object invariants are all assumed to hold, so any values now held by the flow sensitive value state 402 for an object that are not currently accounted for within the flow insensitive invariant state 410 must be added. The flow sensitive invariant state currently only holds the value "8" 636, while the flow sensitive invariant state contains the value "9". The flow sensitive invariant state passes 408 its value list 404 to the flow insensitive invariant state 412, which then widens the invariant for B.x, giving it the new invariant value ">=8" 640, in this example. Some embodiments also pass the values of other variables that might not have been changed, but have been accessed, such as this.y, whose invariant, in any case, has not been altered.

Exemplary System Embodiment

Figure 5:
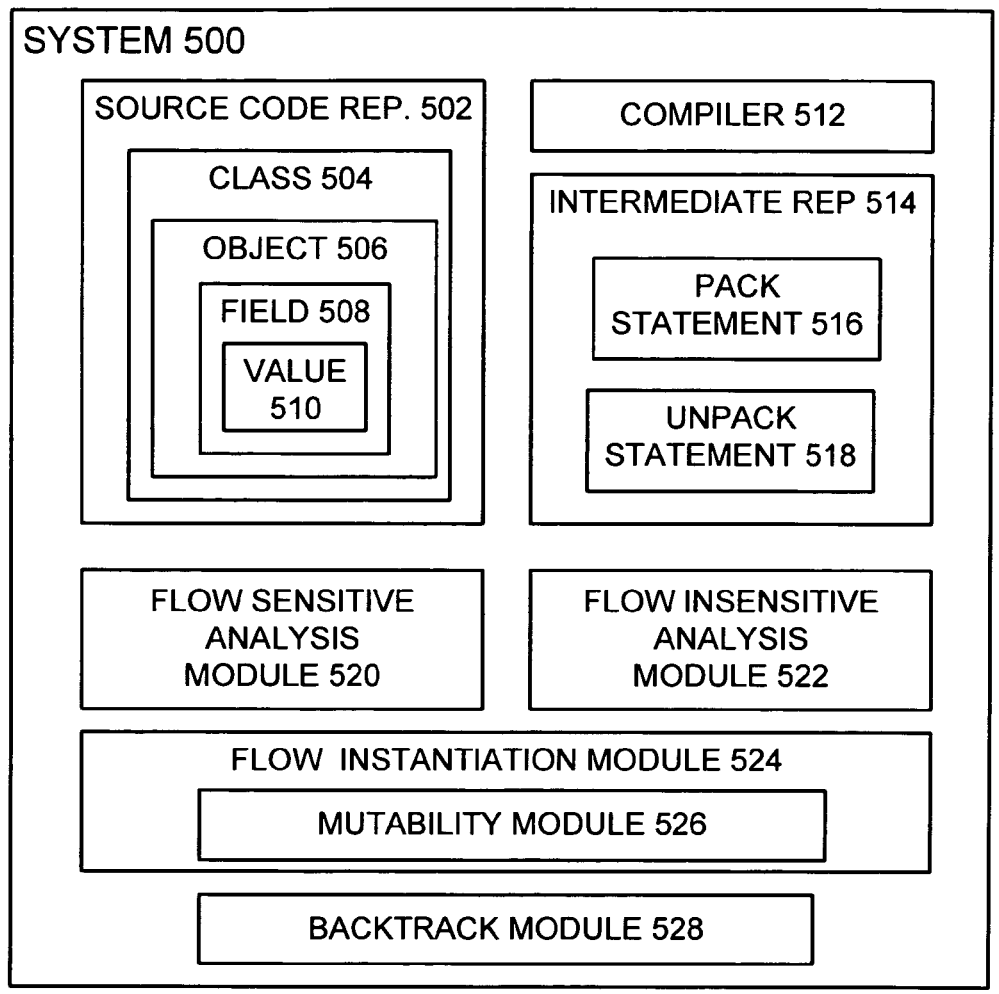
FIG. 5 is a block diagram illustrating an exemplary system embodiment of inferring object invariants.

FIG. 5 illustrates another exemplary embodiment of a computer system 500 that can be used for inferring object invariants. The computer system 500 has a source code representation 502, whose object invariants are to be determined. The source code may be in any object-oriented language (C++, Java, C#, among others) which support classes and objects, as described below. In some embodiments at least some of the at least potential invariants are marked within the source code itself. In others, no information about possible invariants is given directly within the body of the source code. In some source code instantiations, a pack statement and an unpack statement (or a different representation) are used to delineate locations where object invariants hold and are invalid, respectively (not shown).

The source code 502 contains code divided into classes 504, which themselves may contain subclass objects 506. The classes 504 may be abstract or generic, or of a different sort known to those in the art, and may contain, without limitation, a public section, a private section, a protected section, a "friend" construct which allows sharing of data between several so-marked classes, and so forth. A subclass 504 can inherit the functions and data of at least one, and potentially, more than one class. At least a subset of these objects 506 contain fields 508, which hold values, which can also be known as "variables."

The computer system 500 also includes a compiler 512 which compiles a source code representation to generate an intermediate representation of the source code. This intermediate representation 514, in some instantiations, includes the locations where object invariants hold (are valid), and where they do not (are mutable). In some instances, the locations where invariants hold are marked by a pack statement 516 (or an equivalent computer-generated version), and locations where they do not hold are marked by an unpack statement 518 (or an equivalent computer-generated version).

The computer system 500 also contains a flow-sensitive analysis module 520, which analyses the computer program given, either in the source code representation 502, or within an intermediate representation 514. The flow-sensitive analysis module 520 analyses the program at some set of program points, determining the value of at least a subset of the possible defined fields at the program points, and noting at least some of those values that change, paying attention to the program flow. The flow-insensitive analysis module 522, also included, discovers and records invariant values, the values that at least a subset of object fields within the computer program can hold when the objects are valid, taking the program as a set of statements, that is, without paying attention to program flow. It records the values, at least, from the beginning of the analysis to some intermediate program point.

A flow instantiation module 524 is also provided, which passes information between the flow-sensitive analysis module 520 and the flow-insensitive analysis module 522. This module also includes, in some embodiments, a mutability module 526, which indicates when an object is moving from a valid state, when the invariant holds, to a mutable state when the object invariant no longer holds, indicating the need to instantiate the flow insensitive analysis information within the flow-sensitive analysis. The backtrack module 528, present in some systems, is used when an invariant is added to an object. When an invariant is added, the backtrack module 528 backtracks the analysis to those locations that used the smaller invariant list.

Computing Environment

Figure 7:
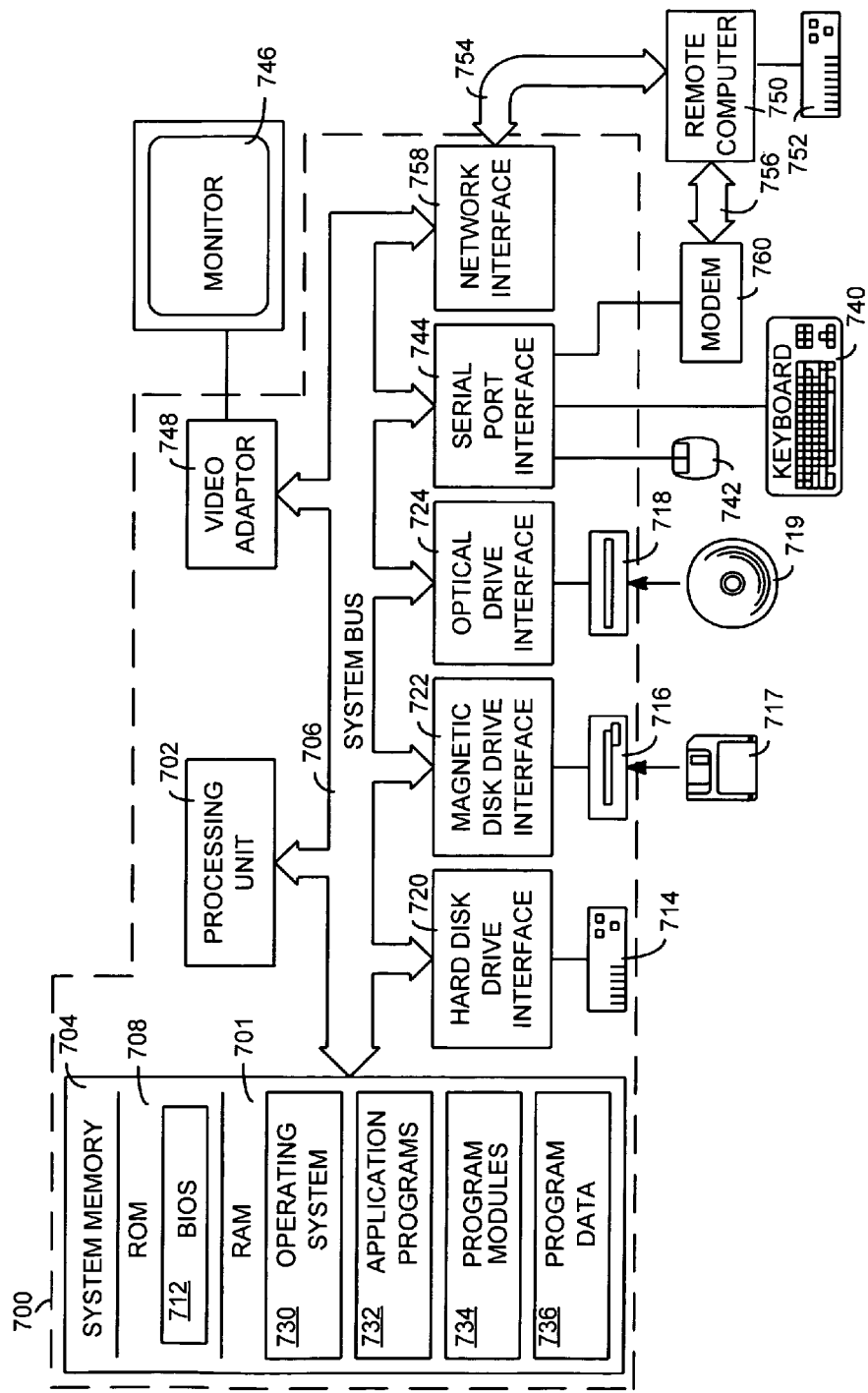
FIG. 7 is a diagram depicting a general-purpose computing device constituting an exemplary system for implementing the disclosed technology.

FIG. 7 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the disclosed technology includes a general purpose computing device in the form of a conventional computer 700, which may be a PC, or a larger system, including a processing unit 702, a system memory 704, and a system bus 706 that couples various system components including the system memory 704 to the processing unit 702. The system bus 706 may be any of several types of bus structures including a memory bus or memory controller, a peripheral bus, and a local bus using any of a variety of bus architectures. The system memory 704 includes read only memory (ROM) 708 and random access memory (RAM) 710. A basic input/output system (BIOS) 712, containing the basic routines that help with the transfer of information between elements within the computer 700, is stored in ROM 708.

The computer 700 further includes one or more of a hard disk drive 714 for reading from and writing to a hard disk (not shown), a magnetic disk drive 716 for reading from or writing to a removable magnetic disk 717, and an optical disk drive 718 for reading from or writing to a removable optical disk 719 (such as a CD-ROM or other optical media). The hard disk drive 714, magnetic disk drive 716, and optical disk drive 718 (if included) are connected to the system bus 706 by a hard disk drive interface 720, a magnetic disk drive interface 722, and an optical drive interface 724, respectively. The drives and their associated computer-readable media provide nonvolatile storage of computer-readable instructions, data structures, program modules, and other data for the computer 700. Other types of computer-readable media which can store data that is accessible by a computer, such as magnetic cassettes, flash memory cards, digital video disks, CDs, DVDs, RAMs, ROMs, and the like (none of which are shown), may also be used in the exemplary operating environment.

A number of program modules may be stored on the hard disk 714, magnetic disk 717, optical disk 719, ROM 708, or RAM 710, including an operating system 730, one or more application programs 732, other program modules 734, and program data 736. A user may enter commands and information into the computer 700 through input devices, such as a keyboard 740 and pointing device 742 (such as a mouse). Other input devices (not shown) may include a digital camera, microphone, joystick, game pad, satellite dish, scanner, or the like (also not shown). These and other input devices are often connected to the processing unit 702 through a serial port interface 744 that is coupled to the system bus 706, but may be connected by other interfaces, such as a parallel port, game port, or universal serial bus (USB) (none of which are shown). A monitor 746 or other type of display device is also connected to the system bus 706 via an interface, such as a video adapter 748. Other peripheral output devices, such as speakers and printers (not shown), may be included.

The computer 700 may operate in a networked environment using logical connections to one or more remote computers, such as a remote computer 750. The remote computer 750 may be another computer, a server, a router, a network PC, or a peer device or other common network node, and typically includes many or all of the elements described above relative to the computer 700, although only a memory storage device 752 has been illustrated in FIG. 7. The logical connections depicted in FIG. 7 include a local area network (LAN) 754 and a wide area network (WAN) 756. Such networking environments are commonplace in offices, enterprise-wide computer networks, intranets, and the Internet.

When used in a LAN networking environment, the computer 700 is connected to the LAN 754 through a network interface 758. When used in a WAN networking environment, the computer 700 typically includes a modem 760 or other means for establishing communications over the WAN 756, such as the Internet. The modem 760, which may be internal or external, is connected to the system bus 706 via the serial port interface 744. In a networked environment, program modules depicted relative to the computer 700, or portions thereof, may be stored in the remote memory storage device 752. The network connections shown are exemplary, and other means of establishing a communications link between the computers may be used.

Alternatives

Having described and illustrated the principles of our invention with reference to the illustrated embodiments, it will be recognized that the illustrated embodiments can be modified in arrangement and detail without departing from such principles.

Elements of the illustrated embodiment shown in software may be implemented in hardware and vice versa. Also, the technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented method for determining invariants within an object oriented program in a computer, comprising:

at least partially running a local analysis of the program wherein the local analysis notes at least one local value of at least one object field of an object within the program at at least one program point wherein the state of the object is either mutable or valid;

at least partially running a global analysis of the program, wherein the global analysis stores invariants in a global analysis invariant storage which the at least one object field has held by the local analysis when the object is valid; and combining the local analysis and the global analysis to infer at least one invariant that is not explicitly declared for the object within the program, wherein the combining comprises:

the local analysis reaching a program point marked by a pack statement where the object transitions from mutable to valid, the at least one local value of the at least one object field associated with the valid object being passed to the global analysis, and wherein if the at least one local value is not included within the current list of invariants in the global analysis invariant storage, the global analysis adds the at least one local value to the current list of invariants in the global analysis invariant storage for the object, and wherein the local analysis keeps track of the local values of the object encountered until the object transitions from mutable to valid;

and the local analysis reaching a program point marked by an unpack statement where the object transitions from valid to mutable, wherein the local values of the mutable object are recorded by the local analysis but the global analysis does not reflect the local values of the mutable object and the local values of the mutable object are not added to the current list of invariants in the global analysis invariant storage, and the global analysis passing information about the stored invariants for the object to the local analysis.

2. The computer implemented method of claim 1 wherein the local analysis analyzes the program at a subset of program points.

3. The computer implemented method of claim 1 wherein the at least one invariant for the object comprises at least one local value held by the at least one object field with an aliased name.

4. The computer implemented method of claim 1 wherein at least one value held by the at least one object field when the object is mutable is not given to the global analysis.

5. The computer implemented method of claim 1 wherein a widen operator is used to add the at least one local value to the current list of invariants of the object.

6. The computer implemented method of claim 1 wherein the at least one invariant comprises all possible values discovered so far that the object has held when the object is in a valid state.

7. The computer implemented method of claim 1, wherein the local analysis is run to end of the program, and wherein the invariant at end of the program run comprises the object invariants for the object.

8. The computer implemented method of claim 1, wherein at at least one unpack statement the global analysis passes a given invariant associated with a given object to the local analysis.

9. The computer implemented method of claim 8, wherein the given invariant for the given object does not hold after an unpack statement.

10. The computer implemented method of claim 9, further comprising backtracking to the program point wherein the given object was moving from a valid to a mutable state.

11. The computer implemented method of claim 1, wherein the global analysis of the program over approximates the values held by the object.

12. The computer implemented method of claim 1, further comprising a class wherein the object is a child of the class, and wherein to move the object from a valid to a mutable state comprises moving the class from a valid to a mutable state.

13. The computer implemented method of claim 1, wherein an aggregate is an object composed from representation objects and wherein the aggregate is made mutable prior to any of the representation objects being made mutable.

14. The computer implemented method of claim 1 wherein the local analysis provides at least one value to the at least one invariant at the pack statement.

15. A computer system having a processor for determining invariants within an object oriented program, comprising:
   a compiler to at least partially run a local analysis of the program wherein the local analysis notes at least one local value of at least one object field of an object within the program at at least one program point wherein the state of the object is either mutable or valid;
   the compiler to at least partially run a global analysis of the program, wherein the global analysis stores invariants in a global analysis invariant storage which the at least one object field has held by the local analysis when the object is valid; and
   the compiler to combine the local analysis and the global analysis to infer at least one invariant that is not explicitly declared for the object within the program,
   wherein the combining comprises:
   the local analysis reaching a program point marked by a pack statement where the object transitions from mutable to valid, the at least one local value of the at least one object field associated with the valid object being given to the global analysis, and wherein if the at least one local value is not included within the current list of invariants in the global analysis invariant storage, the global analysis adds the at least one local value to the current list of invariants in the global analysis invariant storage for the object, and wherein the local analysis keeps track of the local values of the object encountered until the object transitions from mutable to valid;
   and the local analysis reaching a program point marked by an unpack statement where the object transitions from valid to mutable, wherein the local values of the mutable object are recorded by the local analysis but the global analysis does not reflect the local values of the mutable object and the local values of the mutable object are not added to the current list of invariants in the global analysis invariant storage, and the global analysis passing information about the stored invariants for the object to the local analysis.

* * * * *

UNITED STATES PATENT AND TRADEMARK OFFICE
CERTIFICATE OF CORRECTION

PATENT NO. : 7,590,978 B2  Page 1 of 1
APPLICATION NO. : 11/107276
DATED : September 15, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1046 days.

Signed and Sealed this

Twenty-first Day of September, 2010

David J. Kappos
*Director of the United States Patent and Trademark Office*